United States Patent
Bai et al.

(10) Patent No.: US 11,281,510 B2
(45) Date of Patent: Mar. 22, 2022

(54) INTELLIGENT SCALING IN MICROSERVICE-BASED DISTRIBUTED SYSTEMS

(71) Applicant: Kyndryl, Inc., New York, NY (US)

(72) Inventors: Xu Hui Bai, Beijing (CN); Yue Wang, Beijing (CN); Wen Rui Zhao, Beijing (CN); Min Xiang, Beijing (CN); Li Long Chen, Beijing (CN)

(73) Assignee: Kyndryl, Inc., New York, NY (US)

( * ) Notice: Subject to any disclaimer, the term of this patent is extended or adjusted under 35 U.S.C. 154(b) by 0 days.

(21) Appl. No.: 16/986,805

(22) Filed: Aug. 6, 2020

(65) Prior Publication Data
US 2022/0043699 A1    Feb. 10, 2022

(51) Int. Cl.
*G06F 9/54* (2006.01)
*G06F 1/24* (2006.01)

(52) U.S. Cl.
CPC .............. *G06F 9/547* (2013.01); *G06F 1/24* (2013.01)

(58) Field of Classification Search
CPC .................................. G06F 9/547; G06F 1/24
See application file for complete search history.

(56) References Cited

U.S. PATENT DOCUMENTS

| | | |
|---|---|---|
| 10,191,778 B1 | 1/2019 | Yang |
| 10,324,763 B1 | 6/2019 | Abdelsalam |
| 10,389,596 B2 | 8/2019 | Strobel |
| 10,397,240 B2 | 8/2019 | Lewis |
| 2016/0378552 A1* | 12/2016 | Taylor ............... G06F 9/5083 718/105 |
| 2018/0013636 A1 | 1/2018 | Seetharamaiah |

OTHER PUBLICATIONS

Chenhao Qu, Rodrigo N. Calheiros, Rajkumar Buyya; Auto-Scaling Web Applications in Clouds: A Taxonomy and Survey; Jul. 2018; 33 pages (Year: 2018).*
Satish Narayana Srirama, Mainak Adhikari, Souvik Paul; Application deployment using containers with auto-scaling for microservices in cloud environment; Apr. 2, 2020; 20 pages (Year: 2020).*
Guangba Yu; Pengfei Chen; Zibin Zheng; Microscaler: Cost-effective Scaling for Microservice Applications in the Cloud with an Online Learning Approach; Apr. 6, 2020; 17 pages (Year: 2020).*
"Horizontal Pod Autoscaler", kubernetes, last modified on Mar. 5, 2020, 10 pages, <https://kubernetes.io/docs/tasks/run-application/horizontal-pod-autoscale/#how-does-the-horizontal-pod-autoscaler-work>.
Mell et al., "The NIST Definition of Cloud Computing", National Institute of Standards and Technology, Special Publication 800-145, Sep. 2011, 7 pages.

* cited by examiner

*Primary Examiner* — Doon Y Chow
*Assistant Examiner* — Kimberly L Jordan
(74) *Attorney, Agent, or Firm* — Ken Han, Esq.; Kevin P. Radigan, Esq.; Heslin Rothenberg Farley & Mesiti P.C.

(57) ABSTRACT

In an approach to intelligent scaling in a cloud platform, an attribute template is stored for one or more target services based on one or more system data. One or more request metrics for each target service is stored, wherein the request metrics are based on an analysis of one or more incoming requests of one or more service call chains. Responsive to receiving a request for a target service in a service call chain, the target service is scaled based on the attribute template of the target service and the request metrics of the target service.

17 Claims, 12 Drawing Sheets

| | |
|---|---|
| A [3] ->B [10] ->C [] ->D [] ->E [] ->F [6] | T1 |
| A [15] ->B [50] ->C [] ->D [] ->E [] ->F [6] | >= T1 + Tinterval(A, B) |
| A [15] ->B [50] ->C [x] ->D [] ->E [] ->F [6] | >= T1 + Tinterval(A, C) |
| A [15] ->B [50] ->C [x] ->D [x] ->E [] ->F [6] | >= T1 + Tinterval(A, D) |
| A [15] ->B [50] ->C [x] ->D [x] ->E [x] ->F [6] | >= T1 + Tinterval(A, E) |
| A [15] ->B [50] ->C [x] ->D [x] ->E [x] ->F [30] | >= T1 + Tinterval(A, F) |

FIG. 4a

| | |
|---|---|
| A [3] ->B [10] ->C [] ->D [] ->E [] ->F [6] | *T1* |
| A [15] ->B [50] ->C [] ->D [] ->E [] ->F [6] | |
| A [15] ->B [50] ->C [x] ->D [] ->E [] ->F [6] | |
| A [15] ->B [50] ->C [x] ->D [x] ->E [] ->F [6] | |
| A [15] ->B [50] ->C [x] ->D [x] ->E [x] ->F [6] | |
| A [15] ->B [50] ->C [x] ->D [x] ->E [x] ->F [6] | |
| A [15] ->B [50] ->C [x] ->D [x] ->E [x] ->F [30] | *<= T* |

FIG. 4b

| API/URL Pair(A,F) | Request number pair(A,F) | Request arriving time (A->F) |
|---|---|---|
| A1,F1 | 100, 0 | 30s |
| A2,F2 | 150, 0 | 40s |
| A3,F3 | 100, 0 | 10s |
| A4,F4 | 100, 0 | 20s |
| A5,F5 | 100, 0 | 50s |

FIG. 7 ative intention US 11,281,510 B2

INTELLIGENT SCALING IN MICROSERVICE-BASED DISTRIBUTED SYSTEMS

BACKGROUND

The present invention relates generally to the field of data processing systems, and more particularly to intelligent scaling in a cloud platform.

Traditional software development was based on monolithic applications, where tightly coupled components were tied into a single deployable object. The rise of containerization and systems for deploying these containers has completely transformed the traditional application architecture. The use of containerization has led to the adoption of the microservice architecture, where the application is broken down into separate pieces, or microservices, that update and deploy independently. Microservices can be defined as a software architecture in which complex applications are composed of small, independent processes, or services, communicating with each other using language-agnostic Application Programming Interfaces (APIs). These services are small, highly decoupled and focus on doing a small task, facilitating a modular approach to system-building.

This microservice approach provides freedom and flexibility for the programming language used as well as the tools and frameworks that are implemented to administer the application, as individual microservices can be developed in different languages and communicate using a series of APIs.

One of the advantages of microservices is that the individual services can be scaled as necessary to match the resources to the load on the application. Vertical scaling generally refers to increasing the resource limits on an individual service, while horizontal scaling generally refers to increasing the number of instances of the service.

SUMMARY

Embodiments of the present invention disclose a method, a computer program product, and a system for intelligent scaling in a cloud platform. In one embodiment, an attribute template is stored for one or more target services based on one or more system data. One or more request metrics for each target service is stored, wherein the request metrics are based on an analysis of one or more incoming requests of one or more service call chains. Responsive to receiving a request for a target service in a service call chain, the target service is scaled based on the attribute template of the target service and the request metrics of the target service.

BRIEF DESCRIPTION OF THE DRAWINGS

FIG. 4a is an example of the scaling trigger time for a stateful service F, where the request arriving time from service A to service F is 50 seconds, in accordance with an embodiment of the present invention.

FIG. 4b is an example of the scaling trigger time for a stateful service F, where the present invention scales out service F before the request arrives, in accordance with an embodiment of the present invention.

FIG. 7 is a table of the request numbers of service A and service F for an example of the workflow for the invention, within the distributed data processing environment of FIG. 3, in accordance with an embodiment of the present invention.

DETAILED DESCRIPTION

Figure 1:
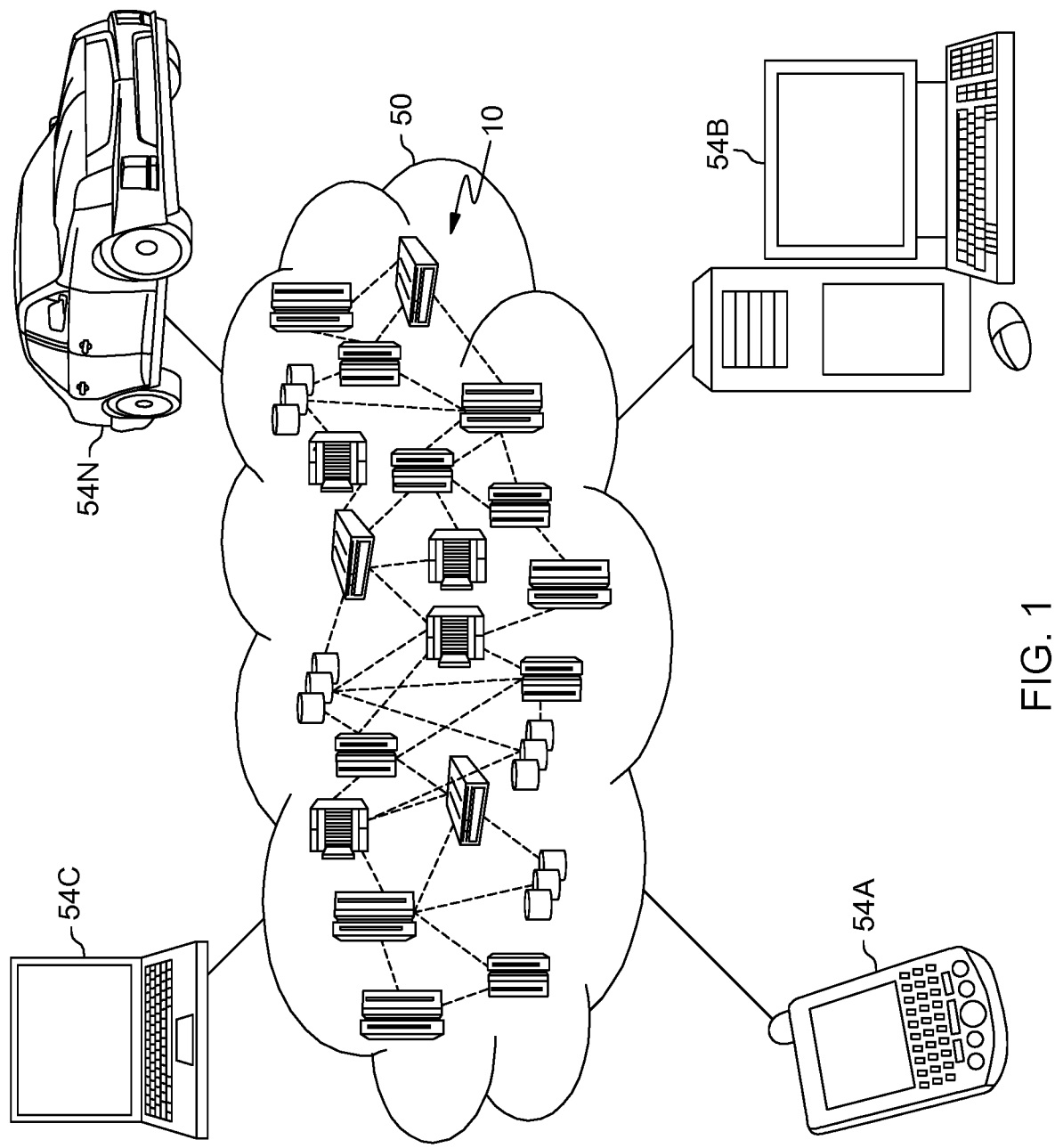
FIG. 1 depicts a cloud computing environment according to an embodiment of the present invention.

In microservice-based distributed systems, one service is dependent on other services in the same service call chain. If one of the services is scaled out or in, downstream services need to be scaled out or in accordingly. If the downstream services cannot be timely scaled out, they may be overloaded which can lead to a cascading series of failures in the whole system.

Most autoscaling mechanisms are based on observed metrics, such as CPU and memory. Services are scaled out or in after metrics are changed. When downstream services are scaled out because of a large number of requests, a readiness probe of the downstream services typically cannot be completed successfully in the time necessary to avoid blocking the execution. Therefore the response will be delayed, or the service call chain may crash.

For stateful services in a cluster, when a service is scaled out and more master/primary nodes are added to the cluster, it will take a significant amount of time to reconfigure the cluster, and the cluster cannot be service ready when needed. This cluster will, therefore, be the bottleneck of the application.

The present invention provides a novel method, computer program product, and system to perform autoscaling activity in advance, so the service will be ready for use by the time the requests are received by the downstream service.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
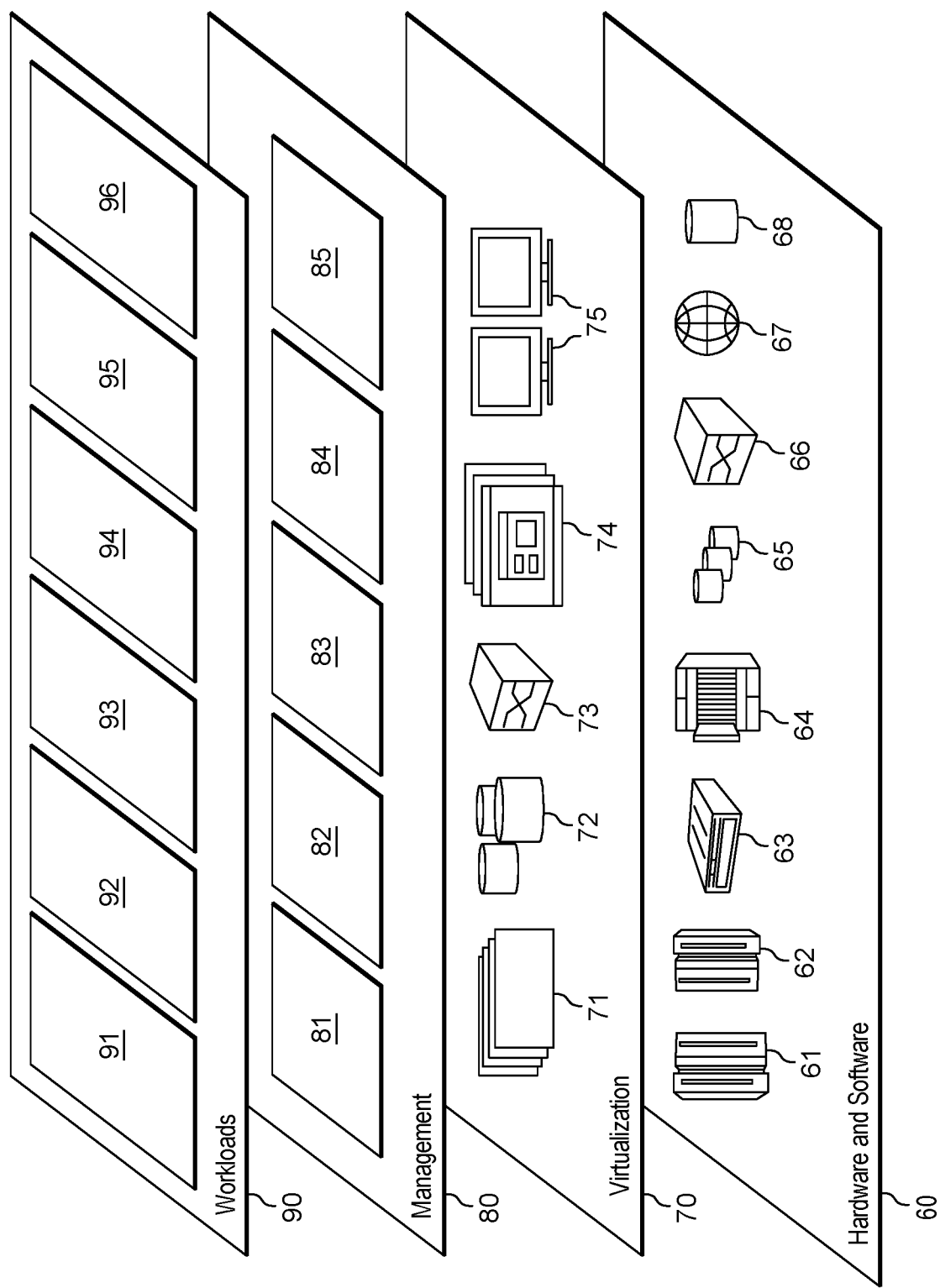
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

The present invention resides in management layer 80 in the functional abstraction layers of FIG. 2.

Figure 3:
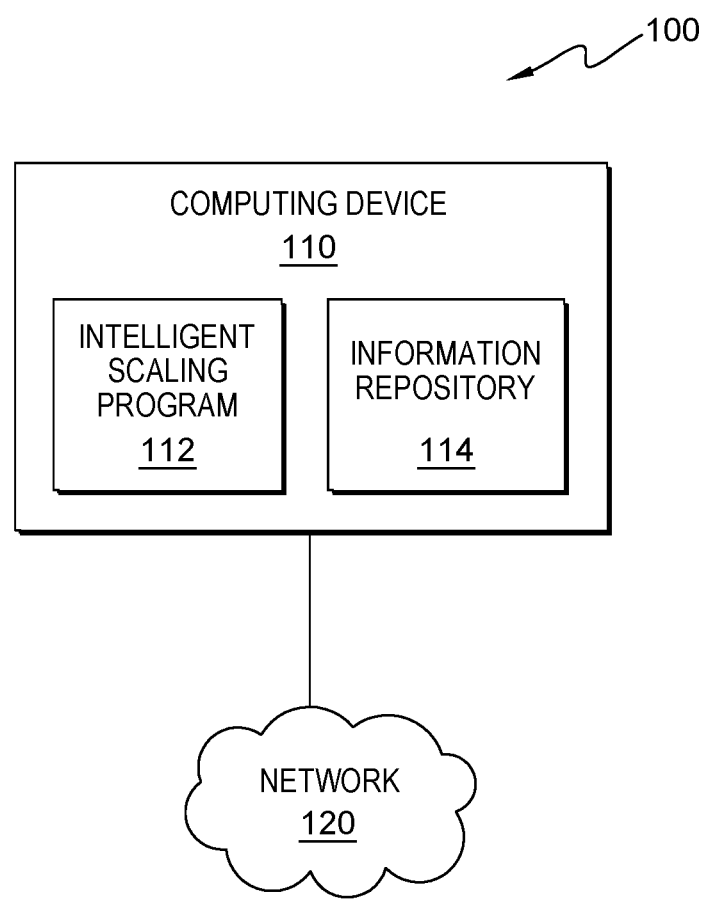
FIG. 3 is a functional block diagram illustrating a distributed data processing environment, in accordance with an embodiment of the present invention.

FIG. 3 is a functional block diagram illustrating a distributed data processing environment, generally designated 100, suitable for operation of intelligent scaling program 112 in accordance with at least one embodiment of the present invention. The term "distributed" as used herein describes a computer system that includes multiple, physically distinct devices that operate together as a single computer system. FIG. 3 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes computing device 110 connected to network 120. Network 120 can be, for example, a telecommunications network, a local area network (LAN), a wide area network (WAN), such as the Internet, or a combination of the three, and can include wired, wireless, or fiber optic connections. Network 120 can include one or more wired and/or wireless networks that are capable of receiving and transmitting data, voice, and/or video signals, including multimedia signals that include voice, data, and video information. In general, network 120 can be any combination of connections and protocols that will support communications between computing device 110 and other computing devices (not shown) within distributed data processing environment 100.

Computing device 110 can be a standalone computing device, a management server, a web server, a mobile computing device, or any other electronic device or computing system capable of receiving, sending, and processing data. In an embodiment, computing device 110 can be a laptop computer, a tablet computer, a netbook computer, a personal computer (PC), a desktop computer, a personal digital assistant (PDA), a smart phone, or any programmable electronic device capable of communicating with other computing devices (not shown) within distributed data processing environment 100 via network 120. In another embodiment, computing device 110 can represent a server computing system utilizing multiple computers as a server system, such as in a cloud computing environment. In yet another embodiment, computing device 110 represents a computing system utilizing clustered computers and components (e.g., database server computers, application server computers) that act as a single pool of seamless resources when accessed within distributed data processing environment 100.

In an embodiment, computing device 110 includes intelligent scaling program 112. In an embodiment, intelligent scaling program 112 is a program, application, or subprogram of a larger program for intelligent scaling in a cloud platform. In an alternative embodiment, intelligent scaling program 112 may be located on any other device accessible by computing device 110 via network 120.

In an embodiment, computing device 110 includes information repository 114. In an embodiment, information repository 114 may be managed by intelligent scaling program 112. In an alternate embodiment, information repository 114 may be managed by the operating system of the device, alone, or together with, intelligent scaling program 112. Information repository 114 is a data repository that can store, gather, compare, and/or combine information. In some embodiments, information repository 114 is located externally to computing device 110 and accessed through a communication network, such as network 120. In some embodiments, information repository 114 is stored on computing device 110. In some embodiments, information repository 114 may reside on another computing device (not shown), provided that information repository 114 is accessible by computing device 110. Information repository 114 includes, but is not limited to, cloud configuration data, container data, microservices data, user data, system configuration data, and other data that is received by intelligent scaling program 112 from one or more sources, and data that is created by intelligent scaling program 112.

Information repository 114 may be implemented using any volatile or non-volatile storage media for storing information, as known in the art. For example, information repository 114 may be implemented with a tape library, optical library, one or more independent hard disk drives, multiple hard disk drives in a redundant array of independent disks (RAID), solid-state drives (SSD), or random-access memory (RAM). Similarly, the information repository 114 may be implemented with any suitable storage architecture known in the art, such as a relational database, an object-oriented database, or one or more tables.

FIG. 4a is an example of the scaling trigger time for a stateful service F, where the request arriving time from service A to service F is 50 seconds, in accordance with an embodiment of the present invention. This example illustrates scaling flow in a service call chain (A to B, B to C, C to D, D to E, and finally E to F), and possible problems when the downstream service (e.g., F) is scaled to a large number (e.g., 30). In this example, the time required to propagate the request from service A to service F is one minute. But with a large scaling number, 30 in this example, service F cannot handle the large scaling in the time allotted, and therefore the service crashes. The other services in the calling chain will then crash due to the avalanche effect of service F crashing.

FIG. 4b is an example of the scaling trigger time for a stateful service F, where the present invention scales out service F before the request arrives, in accordance with an embodiment of the present invention. In this example, the service F is automatically scaled out before the request arrives, so the service is ready for use to immediately handle requests when they arrive. In order to automatically scale out the service before the request arrives, the service call chain and the request arriving time between two services in the chain are generated from the tracing system (i.e., tracing the system logs). The request arriving time is defined as $T_{interval}$ (service X, service Y). Requests of a service at a given time are derived based on the service call chain, and this value is defined as the request number (RN). For the example of FIG. 4a above, scaling of service F will be triggered after requests arrive at service F, i.e., after one minute. Therefore, assuming the initial request of service A occurs at time T1, then the scaling time point is after $T1+T_{interval}$(service A, service F).

For a service, for example service F, service ready time per container number and the request number handled by one container is determined from the logging system. In an embodiment, intelligent scaling program 112 scans the logging system to determine the request number handled by one container for each service to be pre-scaled. Request number per container is defined as RC. Then for a given RN, the needed container number is RN/RC. For example, if intelligent scaling program 112 determines during a scan of the logging system that container X can handle 10 requests, and RN in this example is 100, then the needed container number is 100/10, or 10 containers. In the present invention, the scaling of service F will be triggered in advance, and the advanced time is $T_{ready}$(RN/RC). This represents the time it takes the system to propagate through the service call chain. Since this is performed in advance, the actual time $T_{ready}$ is deducted from the time to propagate through the call chain. The scaling time point of service F is at or even before time T, which is calculated from equation (1) below. Therefore service F will be ready for use when the requests arrive.

$$T=T1+T_{interval}(\text{service } A, \text{service } F)-T_{ready}(RN/RC) \quad (1)$$

This process is described in more detail in FIGS. 9, 10, and 11 below.

Figure 5:
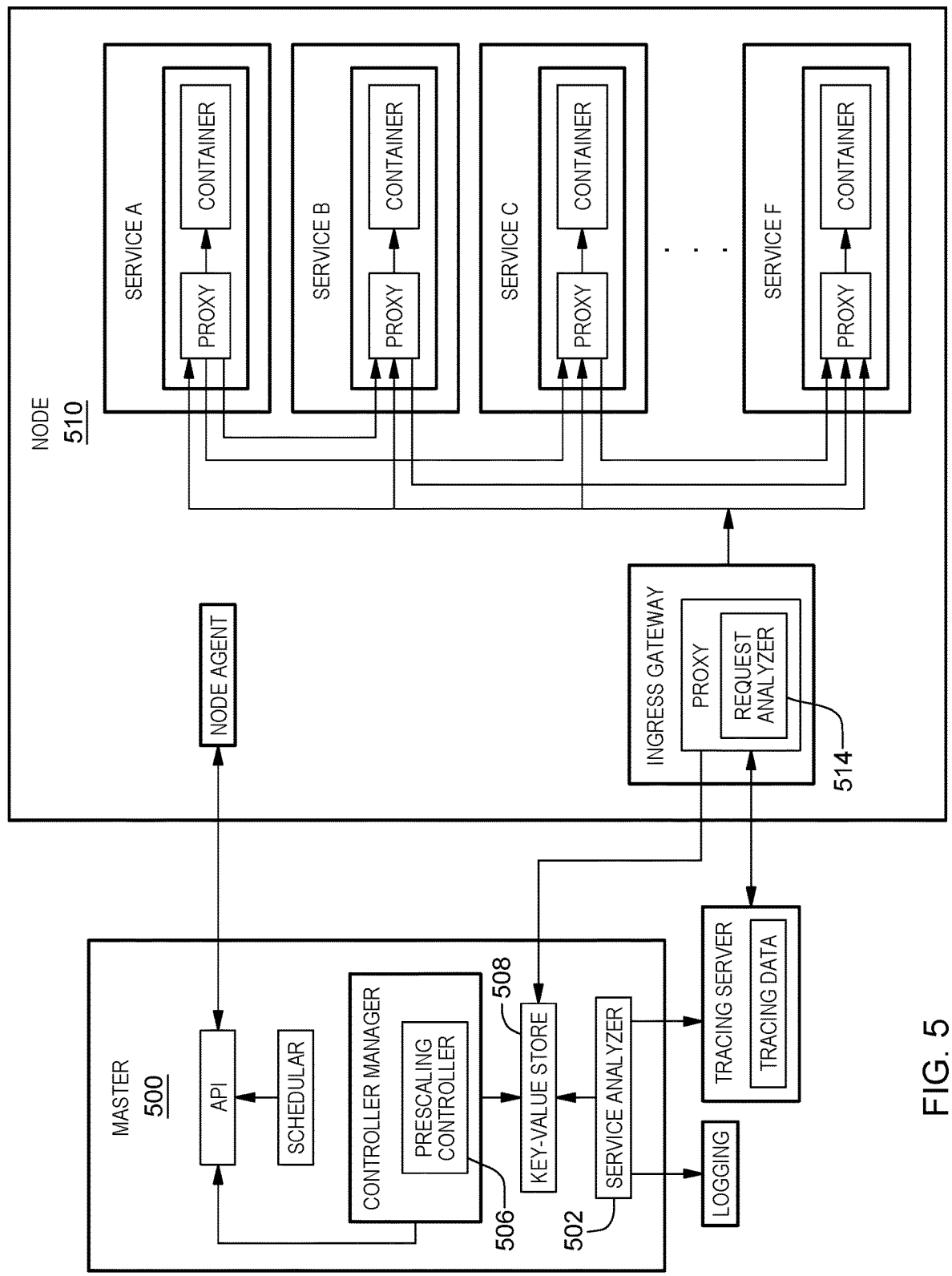
FIG. 5 is an example of a possible system architecture, within the distributed data processing environment of FIG. 3, in accordance with an embodiment of the present invention.

FIG. 5 is an example of a possible system architecture, within the distributed data processing environment of FIG. 3, in accordance with an embodiment of the present invention. In an embodiment, the system includes master 500 and node 510. Master 500 includes service analyzer 502, prescaling controller 506, and key-value store 508. Node 510 includes request analyzer 514. Service analyzer 502 analyzes data from the tracing system and the logging system to find target services that should be handled by the prescaling controller. Service analyzer 502 generates an attribute template of the target service and stores it into key-value store 508. This process is described in more detail in FIG. 9 below.

Request analyzer 514 analyzes incoming requests of a service call chain. Request analyzer 514 then generates request metrics of target services and stores them into key-value store 508. This process is described in more detail in FIG. 10 below.

Prescaling controller 506 reads request metrics of target services from key-value store 508 and automatically scales the target services in or out, as required. This process is described in more detail in FIG. 11 below.

Figure 6:
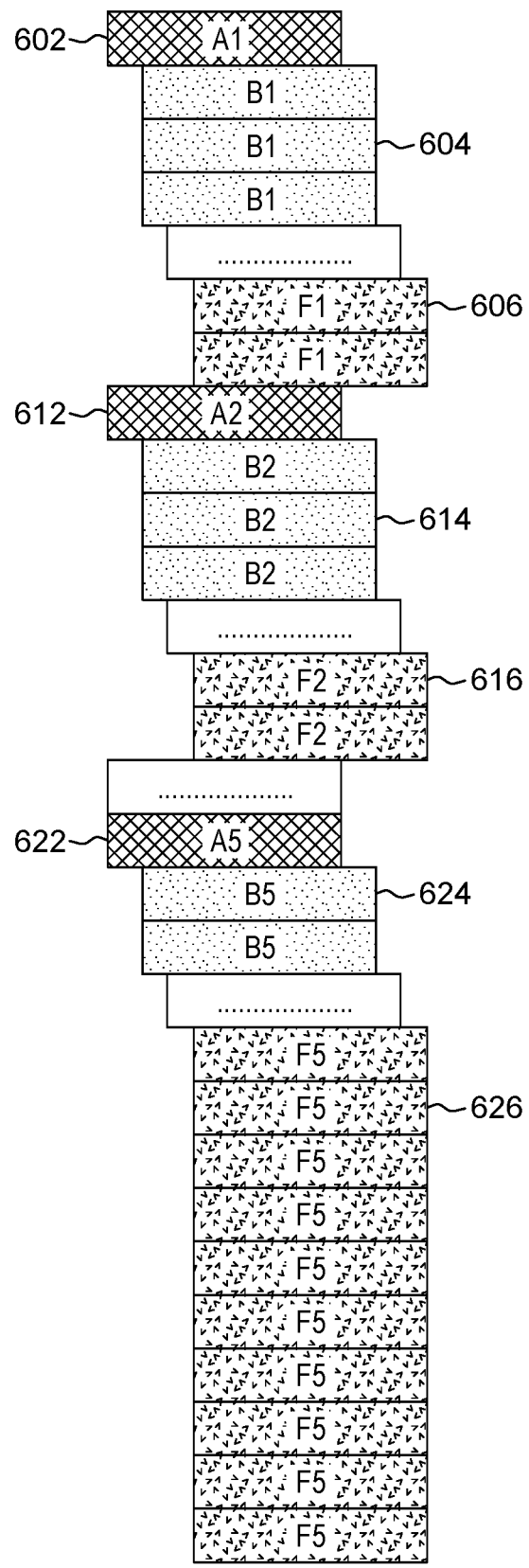
FIG. 6 is an example of service scaling for a target service (F in this case), in accordance with an embodiment of the present invention.

FIG. 6 is an example of service scaling for a target service (F in this case), in accordance with an embodiment of the present invention. This figure illustrates an example of one of the two metrics, either one of which must be met for a service to be handled by the prescaling controller. In this figure, service A has APIs/URLs A1 602, A2 612, through A5 622. Service B, the next service in this example call chain, consists of APIs/URLs B1 604, B2 614, through B5 624. The final service in this example call chain, service F, consists of APIs/URLs F1 606, F2 616, through F5 626. The first metric, the one illustrated in this example, is that the downstream service must be large compared with the starting service. In this example, 10 instances of service API/URL F5 626 are required for each instance of service API/URL A5 622.

The second metric is that the downstream service is protected by a circuit breaker, which is a proxy that controls flow to a service. If the service fails or is too slow, the proxy will trip, or open, the circuit to the container. This must occur often enough that the tripped requests can be queried from system logs. If the number of requests that trip the circuit breaker is large, then service F is a candidate to be set as a target service for the prescaling controller.

In various embodiments, the threshold of both metrics can be configured; users can tune the value based on the result of scaling activities.

FIG. 7 is a table of the request numbers of service A and service F for an example of the workflow for request analyzer 514 from FIG. 5, in accordance with an embodiment of the present invention. The data from the table in FIG. 7 is used in the example below in FIG. 8.

Figure 8:
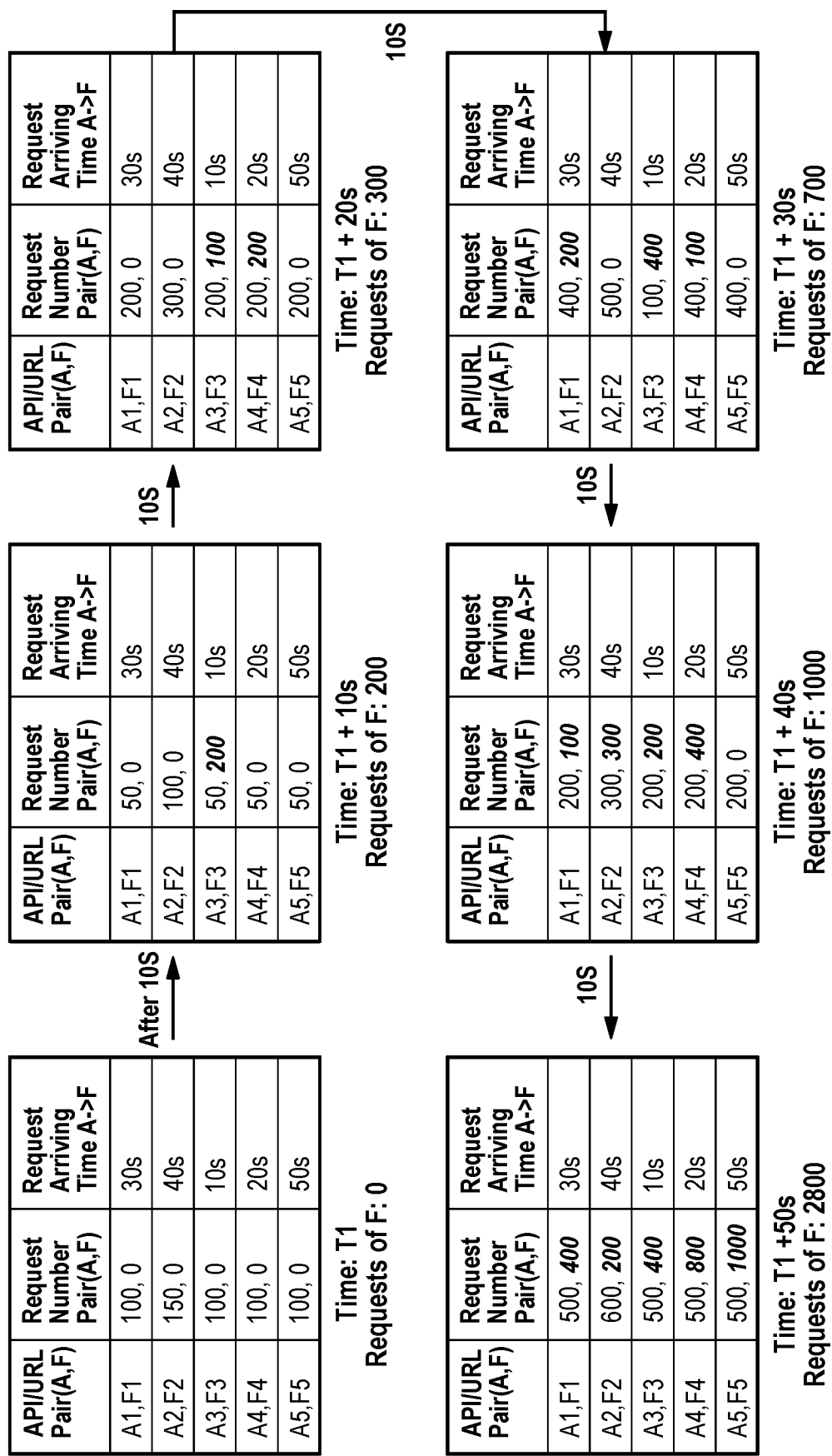
FIG. 8 is an example of the progression of the request numbers of service A through service F for the workflow for the invention, within the distributed data processing environment of FIG. 3, in accordance with an embodiment of the present invention.

FIG. 8 is an example of the progression of the request numbers of service A through service F for request analyzer 514 from FIG. 5, in accordance with an embodiment of the present invention. The data from the table in FIG. 7 above is used in this example. The first step performed by request analyzer 514 is to fetch the API/URL (Uniform Resource Locator) call chain from the tracking system. One service may contains many APIs/URLs. For example, service A and service F are in a service call chain, and service A has 5 service APIs/URLS, called A1, A2, A3, A4, and A5. These five type requests will arrive at service F with APIs/URLs F1, F2, F3, F4, and F5. The next step is to fetch the request arriving time and the request ratio of start service and target service from the tracking system. The final step is to predict the request number for the target service in the service call chain, predicting its request number based on the request number of the start service in the same service call chain, and storing the result into key-value store 514.

For the example illustrated in FIG. 8, the initial time is T1 (00:00), and the request number of service A and F are given in the table in FIG. 7. In addition, for this example, the ratio of "request number of service A" to "request number of service F" is A1:F1 is 1:2; A2:F2 is 1:2; A3:F3 is 1:2; A4:F4 is 1:2; and A5:F5 is 1:10. The request number of service A changes over time, but the request arriving time interval of service A to service F does not change. At time T1, the request number of service A3 is 100, and since service F3 is a downstream service, the request does not arrive at service F3 yet, so the request number pair (service A3, service F3) is 100,0. In this example, the arriving time interval of A3 to F3 is 10 seconds, which means requests from A3 will arrive at F3 after 10 seconds.

At time T1+10 s, the request of A3 arrives at F3, and the request number of F3 is 200 because A3:F3 is 1:2 (i.e., 2 instances of F3 are required for each instance of A3) and number of requests of A3 at T1 is 100. Therefore, 10 seconds after the 100 requests were received for A3, 200 requests of F3 are requested. In this example, at time T1+10 s, the request number of A3 changes to 50. The request number pair of (A3,F3) is now (50,200). Note that this example is demonstrating requests for the services, not the number of actual instances created.

At time T1+20 s, the request of A4 arrives at F4, since the time interval of A4,F4 is 20 seconds. Request of A3 arrives at F3, since time interval of A3,F3 is 10 s, and request number of service A3 is changed to 50 at time T1+10 s.

The request number pairs are provided in the remaining tables of FIG. 8 for each ten second time slice from time T1 through time T1+50 seconds. Note that A1, A2, A3, A4, and A5 belong to service A, and each of them stands for one API or URL. Each service has many APIs, and the tracing system will trace the request at the API level. The consuming time of a request for each API is different, and that is why the time arriving interval for (A1,F1), (A2,F2), (A3,F3), (A4,F4) and (A5,F5) are different.

The example illustrated in FIG. 8 is implemented in the flow diagrams explained in FIGS. 9, 10, and 11 below.

Figure 9:
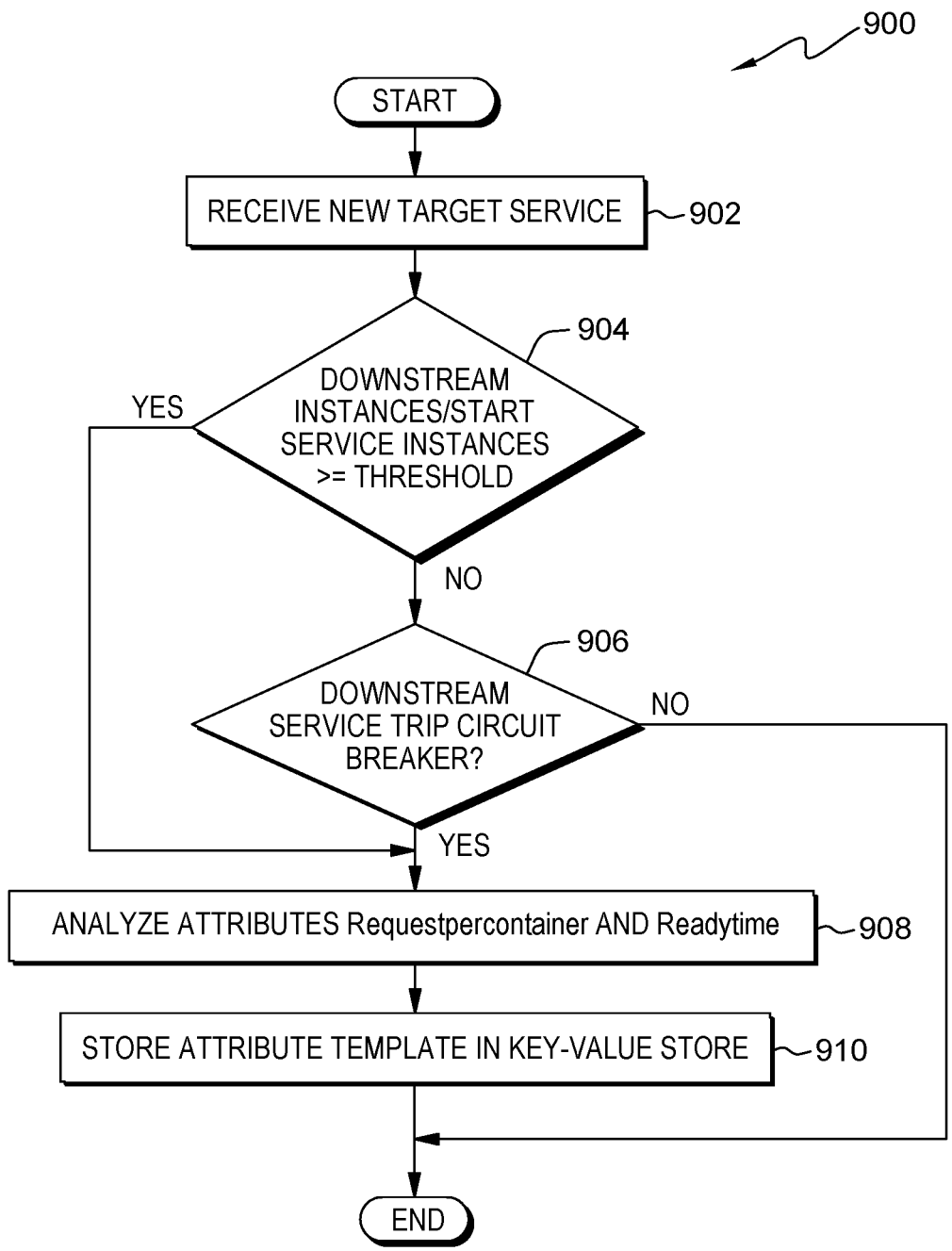
FIG. 9 is a flowchart for the steps for the service analyzer functions performed by the master of the intelligent scaling program, within the distributed data processing environment of FIG. 3, in accordance with an embodiment of the present invention.

FIG. 9 is a flow chart diagram of workflow 900 depicting operational steps of the service analyzer functions performed by the master of intelligent scaling program 112, for example, master 500 from FIG. 5, for each target service.

In an alternative embodiment, the steps of workflow 900 may be performed by any other program while working with intelligent scaling program 112. In an embodiment, intelligent scaling program 112 receives a new target service to analyze for possible inclusion into intelligent scaling. In an embodiment, intelligent scaling program 112 determines if the ratio of the downstream instances to the start services instances meets or exceeds a threshold. In an embodiment, intelligent scaling program 112 determines if the downstream service trips a circuit breaker often enough that the tripped requests can be queried from system logs. In an embodiment, intelligent scaling program 112 reads data from the logging system, analyzes the attributes RequestPerContainer and ReadyTime of the target service, and creates the attribute template. In an embodiment, intelligent scaling program 112 stores the attribute template in the key-value store for the prescaling controller.

It should be appreciated that embodiments of the present invention provide at least for the service analyzer functions performed by the master of intelligent scaling program 112 for each target service. However, FIG. 9 provides only an illustration of one implementation and does not imply any limitations with regard to the environments in which different embodiments may be implemented. Many modifications to the depicted environment may be made by those skilled in the art without departing from the scope of the invention as recited by the claims.

It should be appreciated that the process depicted in FIG. 9 illustrates one possible iteration of the service analyzer functions performed by the master of intelligent scaling program 112, which repeats for each target service.

Intelligent scaling program 112 receives a new target service (step 902). In an embodiment, intelligent scaling program 112 receives a new target service to analyze for possible inclusion into intelligent scaling. In an embodiment, intelligent scaling program 112 receives a new target service to analyze each time a new service is established. In another embodiment, intelligent scaling program 112 analyzes data from the tracing system and the logging system to find a target service to analyze.

Intelligent scaling program 112 determines if the ratio of downstream instances to start service instances>=a threshold (decision block 904). In an embodiment, if intelligent scaling program 112 determines that the ratio of the downstream instances to start services instances does not meet or exceed a threshold, then intelligent scaling program 112 proceeds to decision block 906 ("no" branch, decision block 904). This is the first metric of the example described in FIG. 6, above. In an embodiment, the downstream service must be large compared with the starting service. In the example of FIG. 6, 10 instances of service F are required for each instance of service A. In an embodiment, the threshold of this metric can be configured by the user. In another embodiment, the threshold of this metric can be a system default. In an embodiment, the user can tune the value based on the result of scaling activities.

In an embodiment, if intelligent scaling program 112 determines that the ratio of the downstream instances to the start services instances meets or exceeds a threshold, then intelligent scaling program 112 proceeds to step 908 ("yes" branch, decision block 904).

Intelligent scaling program 112 determines if the downstream service trips a circuit breaker (decision block 906). In this context, a circuit breaker is a proxy that controls flow to a service. If the service fails or is too slow, the proxy will trip, or open, the circuit to the container. In an embodiment, if intelligent scaling program 112 determines that the downstream service (for example, service F from the above examples) trips a circuit breaker often enough that the tripped requests can be queried from system logs ("yes" branch, decision block 906), then intelligent scaling program 112 proceeds to step 908 to analyze the service further. In an embodiment, if intelligent scaling program 112 determines that the downstream service does not trip a circuit breaker often enough that the tripped requests can be queried from system logs ("no" branch, decision block 906), then intelligent scaling program 112 ends for this service, since neither metric has been met or exceeded.

Intelligent scaling program 112 analyzes the attributes RequestPerContainer and ReadyTime (step 908). In an embodiment, intelligent scaling program 112 reads data from the logging system, analyzes the attributes RequestPerContainer and ReadyTime of the target service, and creates the attribute template. In an embodiment, the attribute RequestPerContainer is the number of requests that can be handled by one container. In an embodiment, the attribute ReadyTime is the time that it takes for services to configure before they are ready for use. In an embodiment, the attribute ReadyTime has two attributes; ContainerRange, which is the range of valid container numbers; and Value, the time to configure the service for a given container number range.

Intelligent scaling program 112 stores the attribute template in the key-value store (step 910). In an embodiment, intelligent scaling program 112 stores the attribute template in the key-value store for the prescaling controller, such as prescaling controller 506 from FIG. 5.

Figure 10:
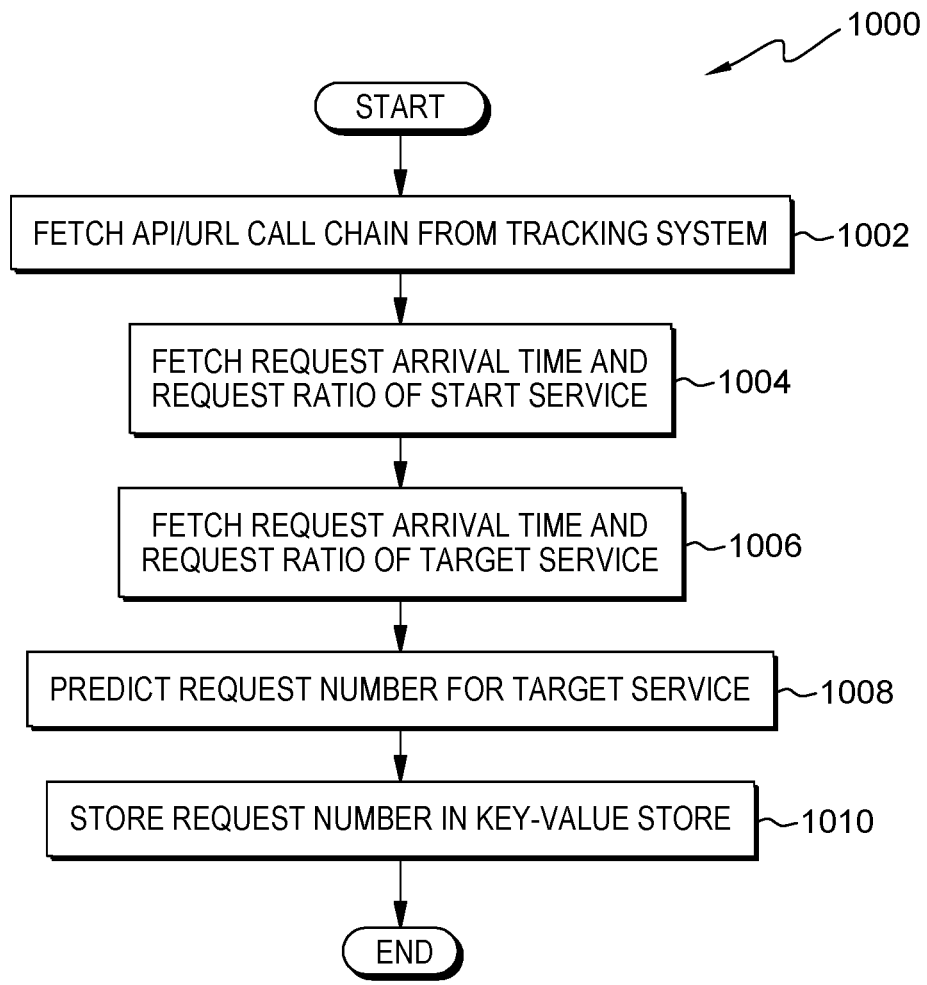
FIG. 10 is a flowchart for the steps for the request analyzer functions performed by the node of the intelligent scaling program, within the distributed data processing environment of FIG. 3, in accordance with an embodiment of the present invention.

FIG. 10 is a flow chart diagram of workflow 1000 depicting operational steps of the request analyzer functions performed by the node of the master of intelligent scaling program 112, for example, node 510 from FIG. 5, for each incoming request of the service call chain.

In an alternative embodiment, the steps of workflow 1000 may be performed by any other program while working with intelligent scaling program 112. In an embodiment, intelligent scaling program 112 fetches the API/URL call chain from the tracking system. In an embodiment, intelligent scaling program 112 fetches the request arriving time and request ratio of the start service from the key-value store. In an embodiment, intelligent scaling program 112 fetches the request arriving time and request ratio of the target service from the key-value store. In an embodiment, intelligent scaling program 112 predicts the request number for the target service in the service call chain based on the request number of the start service in the same service call chain. In an embodiment, intelligent scaling program 112 stores the number of requests for the target service in the key-value store for the prescaling controller.

It should be appreciated that embodiments of the present invention provide at least for the request analyzer functions performed by the node of the master of intelligent scaling program 112 for each incoming request of the service call chain. However, FIG. 10 provides only an illustration of one implementation and does not imply any limitations with regard to the environments in which different embodiments may be implemented. Many modifications to the depicted environment may be made by those skilled in the art without departing from the scope of the invention as recited by the claims.

It should be appreciated that the process depicted in FIG. 10 is illustrates one possible iteration of the request analyzer functions performed by the node of the master of intelligent scaling program 112 for each incoming request of the service call chain, which repeats each time a request of the service call chain is received by intelligent scaling program 112.

Intelligent scaling program 112 fetches the API/URL call chain from the tracking system (step 1002). Since one service may contain many APIs/URLs, in an embodiment intelligent scaling program 112 fetches the API/URL call chain from the tracking system. For example, service A and service F from the example in FIG. 6 are in a service call chain, and service A has 5 service APIs/URLS, including A1, A2, A3, A4, and A5. These 5 type requests will be fetched for service F with APIs/URLs F1, F2, F3, F4, and F5.

Intelligent scaling program 112 fetches the request arrival time and the request ratio of the start service (step 1004). In an embodiment, intelligent scaling program 112 fetches the request arriving time and request ratio of the start service from the key-value store.

Intelligent scaling program 112 fetches the request arrival time and the request ratio of the target service (step 1006). In an embodiment, intelligent scaling program 112 fetches the request arriving time and request ratio of the target service from the key-value store.

Intelligent scaling program 112 predicts the request number for the target service (step 1008). In an embodiment, intelligent scaling program 112 predicts the request number for the target service in the service call chain based on the request number of the start service in the same service call chain. For example, if the request number for the start service is 10, and the ratio of start request to target request is 1:10, then intelligent scaling program 112 predicts the request number for the target service is 100.

Intelligent scaling program 112 stores the request number in the key-value store (step 1010). In an embodiment, intelligent scaling program 112 stores the number of requests for the target service in the key-value store for the prescaling controller, such as prescaling controller 506 from FIG. 5.

Figure 11:
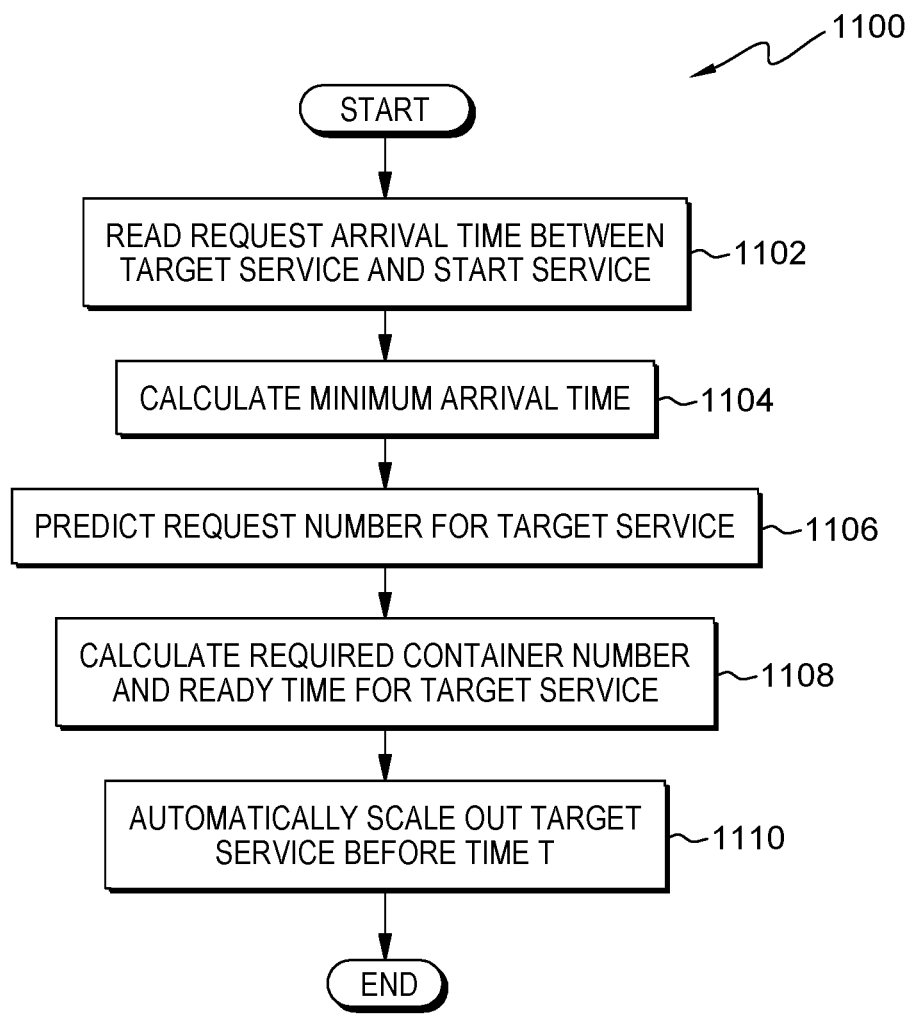
FIG. 11 is a flowchart for the steps for the prescaling controller functions performed by the intelligent scaling program, within the distributed data processing environment of FIG. 3, in accordance with an embodiment of the present invention.

FIG. 11 is a flow chart diagram of workflow 1100 depicting operational steps of the prescaling controller functions performed by the master of intelligent scaling program 112 each time a service arrives in a call chain.

In an alternative embodiment, the steps of workflow 1100 may be performed by any other program while working with intelligent scaling program 112. In an embodiment, intelligent scaling program 112 reads the arrival time between the target service and the start service each time a new target service arrives in a call chain. In an embodiment, intelligent scaling program 112 calculates the minimum arrival time, $T_{min}$, between the target service and the start service. In an embodiment, intelligent scaling program 112 predicts the request number of the target service based on the request metrics stored in the key-value store by the request analyzer. In an embodiment, intelligent scaling program 112 calculates the required number of containers and the time the containers must be ready based on the number of requests for the start service and the attribute template for the target service stored in the key-value store. In an embodiment, intelligent scaling program 112 automatically scales out the target service before time T, where $T=T1+T_{min}-T_{ready}$.

It should be appreciated that embodiments of the present invention provide at least for the prescaling controller functions performed by the master of intelligent scaling program 112 each time a service arrives in a call chain. However, FIG. 11 provides only an illustration of one implementation and does not imply any limitations with regard to the environments in which different embodiments may be implemented. Many modifications to the depicted environment may be made by those skilled in the art without departing from the scope of the invention as recited by the claims.

It should be appreciated that the process depicted in FIG. 11 is illustrates one possible iteration of the prescaling controller functions performed by the master of intelligent scaling program 112, which repeats each time a service arrives in a call chain.

Intelligent scaling program 112 reads the request arrival time between the target service and the start service (step 1102). In an embodiment, intelligent scaling program 112 reads the arrival time between the target service and the start service based on the request metrics stored in the key-value store each time a new target service arrives in a call chain.

Intelligent scaling program 112 calculates the minimum arrival time (step 1104). In an embodiment, intelligent scaling program 112 calculates the minimum arrival time, $T_{min}$, between the target service and the start service. Intelligent scaling program 112 uses the formula in equation (2) to calculate the minimum arrival time.

$$T_{min}=\text{Minimum}(T_{interval}(\text{API } i \text{ of start service}, \text{API } i \text{ of target service})) \qquad (2)$$

Requests consumed by API i of the start service (for example, API A1 in FIG. 6) will arrive at API i of the downstream service (for example, API F1 in FIG. 6) after time $T_{min}$. $T_{interval}$(API i of start service, API i of target service)) is calculated based on data retrieved from the tracing system.

Intelligent scaling program 112 predicts the request number for the target service (step 1106). In an embodiment, intelligent scaling program 112 predicts the request number of the target service based on an analysis of the request metrics stored in the key-value store by the request analyzer, for example, request analyzer 514 from FIG. 5. In the example from step 1008 in FIG. 10, the ratio of start request to target request is 1:10, so intelligent scaling program 112 predicts the request number of the target service based on that ratio.

Intelligent scaling program 112 calculates the required container number and ready time for the target service (step 1108). In an embodiment, intelligent scaling program 112 calculates the required number of containers and the time the containers must be ready based on the number of requests for the start service and the attribute template for the target service stored in the key-value store. FIG. 4a above illustrates an example of the calculation of the container number and ready time.

Intelligent scaling program 112 automatically scales out the target service before time T (step 1110). In an embodiment, intelligent scaling program 112 automatically scales out the target service before time T, where $T=T1+T_{min}-T_{ready}$. The calculation of $T_{ready}$ is illustrated in the example of FIG. 4b above.

Figure 12:
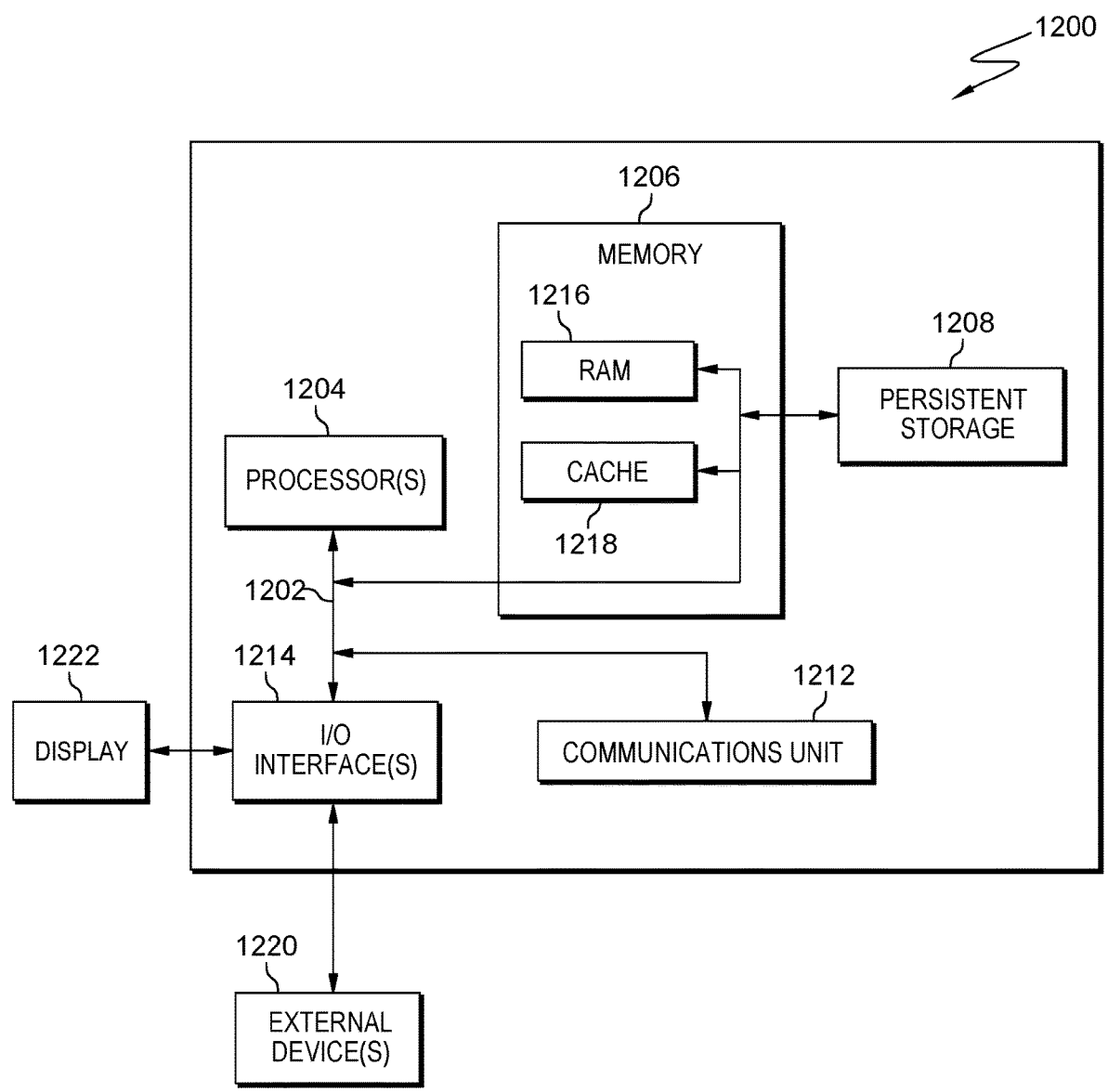
FIG. 12 depicts a block diagram of components of the computing devices executing the intelligent scaling program within the distributed data processing environment of FIG. 3, in accordance with an embodiment of the present invention.

FIG. 12 is a block diagram depicting components of computing device 110 suitable for intelligent scaling program 112, in accordance with at least one embodiment of the invention. FIG. 12 displays the computer 1200, one or more processor(s) 1204 (including one or more computer processors), a communications fabric 1202, a memory 1206 including, a random-access memory (RAM) 1216, and a cache 1218, a persistent storage 1208, a communications unit 1212, I/O interfaces 1214, a display 1222, and external devices 1220. It should be appreciated that FIG. 12 provides only an illustration of one embodiment and does not imply any limitations with regard to the environments in which different embodiments may be implemented. Many modifications to the depicted environment may be made.

As depicted, the computer 1200 operates over the communications fabric 1202, which provides communications between the computer processor(s) 1204, memory 1206, persistent storage 1208, communications unit 1212, and input/output (I/O) interface(s) 1214. The communications fabric 1202 may be implemented with an architecture suitable for passing data or control information between the processors 1204 (e.g., microprocessors, communications processors, and network processors), the memory 1206, the external devices 1220, and any other hardware components within a system. For example, the communications fabric 1202 may be implemented with one or more buses.

The memory 1206 and persistent storage 1208 are computer readable storage media. In the depicted embodiment, the memory 1206 comprises a RAM 1216 and a cache 1218. In general, the memory 1206 can include any suitable volatile or non-volatile computer readable storage media. Cache 1218 is a fast memory that enhances the performance of processor(s) 1204 by holding recently accessed data, and near recently accessed data, from RAM 1216.

Program instructions for intelligent scaling program 112 may be stored in the persistent storage 1208, or more generally, any computer readable storage media, for execution by one or more of the respective computer processors 1204 via one or more memories of the memory 1206. The persistent storage 1208 may be a magnetic hard disk drive, a solid-state disk drive, a semiconductor storage device, read only memory (ROM), electronically erasable programmable read-only memory (EEPROM), flash memory, or any other computer readable storage media that is capable of storing program instruction or digital information.

The media used by persistent storage 1208 may also be removable. For example, a removable hard drive may be used for persistent storage 1208. Other examples include optical and magnetic disks, thumb drives, and smart cards that are inserted into a drive for transfer onto another computer readable storage medium that is also part of persistent storage 1208.

The communications unit 1212, in these examples, provides for communications with other data processing systems or devices. In these examples, the communications unit 1212 includes one or more network interface cards. The communications unit 1212 may provide communications through the use of either or both physical and wireless communications links. In the context of some embodiments of the present invention, the source of the various input data may be physically remote to the computer 1200 such that the input data may be received, and the output similarly transmitted via the communications unit 1212.

The I/O interface(s) 1214 allows for input and output of data with other devices that may be connected to computer 1200. For example, the I/O interface(s) 1214 may provide a connection to external device(s) 1220 such as a keyboard, a keypad, a touch screen, a microphone, a digital camera, and/or some other suitable input device. External device(s) 1220 can also include portable computer readable storage media such as, for example, thumb drives, portable optical or magnetic disks, and memory cards. Software and data used to practice embodiments of the present invention, e.g., intelligent scaling program 112, can be stored on such portable computer readable storage media and can be loaded onto persistent storage 1208 via the I/O interface(s) 1214. I/O interface(s) 1214 also connect to a display 1222.

Display 1222 provides a mechanism to display data to a user and may be, for example, a computer monitor. Display 1222 can also function as a touchscreen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for intelligent scaling of microservices, the computer-implemented method comprising:
   storing, by one or more computer processors, an attribute template for one or more target services based on one or more system data;
   storing, by the one or more computer processors, one or more request metrics for each target service of the one or more target services, wherein the request metrics are based on an analysis of one or more incoming requests of one or more service call chains;
   responsive to receiving a request for a target service of the one or more target services in a service call chain of the one or more service call chains, scaling, by the one or more computer processors, the target service based on the attribute template and the request metrics; and
   wherein storing the attribute template for the one or more target services based on the one or more system data comprises:
      receiving, by the one or more computer processors, the one or more target services;
      determining, by the one or more computer processors, if a ratio of one or more downstream service instances to a start service instances exceeds a threshold for any target service of the one or more target services;
      responsive to determining that the ratio of the downstream service instances to the start service instances exceeds the threshold for any target service of the one or more target services, analyzing, by the one or more computer processors, the attributes for the any target service that exceeds the threshold, wherein the attributes for the any target service include a number of requests per container and a ready time for the container; and storing, by the one or more computer processors, the attribute template for the one or more target services.

2. The computer-implemented method of claim 1, wherein storing the attribute template for the one or more target services based on the one or more system data further comprises:

receiving, by the one or more computer processors, the one or more target services;

determining, by the one or more computer processors, if a downstream service trips a circuit breaker for any target service of the one or more target services;

responsive to determining that the downstream service trips a circuit breaker for the any target service of the one or more target services, analyzing, by the one or more computer processors, the attributes for the any target service of the one or more target services, wherein the attributes include a number of requests per container and a ready time for the container; and storing, by the one or more computer processors, the attribute template for the any target service of the one or more target services.

3. The computer-implemented method of claim 1, wherein storing the one or more request metrics for each target service of the one or more target services comprises:

retrieving, by the one or more computer processors, an API/URL call chain from a tracking system for each service call chain of one or more service call chains;

retrieving, by the one or more computer processors, a start request arrival time and a start request ratio for each start service in the one or more service call chains from the API/URL call chain;

retrieving, by the one or more computer processors, a target request arrival time and a target request ratio for the each target service in the one or more service call chains from the API/URL call chain;

predicting, by the one or more computer processors, a request number for the each target service in the one or more service call chains from the API/URL call chain; and storing, by the one or more computer processors, the request number for the each target service.

4. The computer-implemented method of claim 1, wherein scaling the target service based on the attribute template of the target service and the request metrics of the target service comprises:

retrieving, by the one or more computer processors, a read request arrival time for the target service from the attribute template;

calculating, by the one or more computer processors, a minimum arrival time for the target service based on the read request arrival time for the target service from the attribute template;

predicting, by the one or more computer processors, a request number for the target service based on the attribute template;

calculating, by the one or more computer processors, a required container number and a ready time for the target service based on a predicted request number for the target service; and scaling, by the one or more computer processors, the target service to the required container number.

5. The computer-implemented method of claim 4, wherein scaling the target service based on the attribute template and the request metrics further comprises automatically scaling the target service before an arrival time, wherein the arrival time is a minimum arrival time between the target service and the start service minus the ready time for the target service.

6. The computer-implemented method of claim 1, wherein the one or more system data includes at least one of a tracing system data and a logging system data.

7. A computer program product for intelligent scaling of microservices, the computer program product comprising one or more computer readable storage media and program instructions stored on the one or more computer readable storage media, the program instructions including instructions to:

store an attribute template for one or more target services based on one or more system data;

store one or more request metrics for each target service of the one or more target services, wherein the request metrics are based on an analysis of one or more incoming requests of one or more service call chains;

responsive to receiving a request for a target service of the one or more target services in a service call chain of the one or more service call chains, scale the target service based on the attribute template and the request metrics; and wherein storing the attribute template for the one or more target services based on the one or more system data comprises one or more of the following program instructions, stored on the one or more computer readable storage media, to:

receive the one or more target services;

determine if a ratio of one or more downstream service instances to a start service instances exceeds a threshold for any target service of the one or more target services;

responsive to determining that the ratio of the downstream service instances to the start service instances exceeds the threshold for any target service of the one or more target services, analyze the attributes for the any target service that exceeds the threshold, wherein the attributes for the any target service include a number of requests per container and a ready time for the container; and store the attribute template for the one or more target services.

8. The computer program product of claim 7, wherein storing the attribute template for the one or more target services based on the one or more system data further comprises one or more of the following program instructions, stored on the one or more computer readable storage media, to:

receive the one or more target services;

determine if a downstream service trips a circuit breaker for any target service of the one or more target services;

responsive to determining that the downstream service trips a circuit breaker for the any target service of the one or more target services, analyze the attributes for the any target service of the one or more target services, wherein the attributes include a number of requests per container and a ready time for the container; and store the attribute template for the any target service of the one or more target services.

9. The computer program product of claim 7, wherein storing the one or more request metrics for each target service of the one or more target services comprises:

retrieve an API/URL call chain from a tracking system for each service call chain of one or more service call chains;

retrieve a start request arrival time and a start request ratio for each start service in the one or more service call chains from the API/URL call chain;

retrieve a target request arrival time and a target request ratio for the each target service in the one or more service call chains from the API/URL call chain;

predict a request number for the each target service in the one or more service call chains from the API/URL call chain; and store the request number for the each target service.

10. The computer program product of claim 7, wherein scaling the target service based on the attribute template and the request metrics comprises:

retrieve a read request arrival time for the target service from the attribute template;

calculate a minimum arrival time for the target service based on the read request arrival time for the target service from the attribute template;

predict a request number for the target service based on the attribute template;

calculate a required container number and a ready time for the target service based on a predicted request number for the target service; and scale the target service to the required container number.

11. The computer program product of claim 10, wherein scaling the target service based on the attribute template and the request metrics further comprises automatically scaling the target service before an arrival time, wherein the arrival time is a minimum arrival time between the target service and the start service minus the ready time for the target service.

12. The computer program product of claim 7, wherein the one or more system data includes at least one of a tracing system data and a logging system data.

13. A computer system for intelligent scaling of microservices, the computer system comprising:

one or more computer processors;

one or more computer readable storage media; and program instructions stored on the one or more computer readable storage media for execution by at least one of the one or more computer processors, the stored program instructions including instructions to:

store an attribute template for one or more target services based on one or more system data;

store one or more request metrics for each target service of the one or more target services, wherein the request metrics are based on an analysis of one or more incoming requests of one or more service call chains;

responsive to receiving a request for a target service of the one or more target services in a service call chain of the one or more service call chains, scale the target service based on the attribute template and the request metrics; and wherein storing the attribute template for the one or more target services based on the one or more system data comprises one or more of the following program instructions, stored on the one or more computer readable storage media, to:

receive the one or more target services;

determine if a ratio of one or more downstream service instances to a start service instances exceeds a threshold for any target service of the one or more target services;

responsive to determining that the ratio of the downstream service instances to the start service instances exceeds the threshold for any target service of the one or more target services, analyze the attributes for the any target service that exceeds the threshold, wherein the attributes for the any target service include a number of requests per container and a ready time for the container; and store the attribute template for the one or more target services.

14. The computer system of claim 13, wherein storing the attribute template for the one or more target services based on the one or more system data further comprises one or more of the following program instructions, stored on the one or more computer readable storage media, to:

receive the one or more target services;

determine if a downstream service trips a circuit breaker for any target service of the one or more target services;

responsive to determining that the downstream service trips a circuit breaker for the any target service of the one or more target services, analyze the attributes for the any target service of the one or more target services, wherein the attributes include a number of requests per container and a ready time for the container; and store the attribute template for the any target service of the one or more target services.

15. The computer system of claim 13, wherein storing the one or more request metrics for each target service of the one or more target services comprises:

retrieve an API/URL call chain from a tracking system for each service call chain of one or more service call chains;

retrieve a start request arrival time and a start request ratio for each start service in the one or more service call chains from the API/URL call chain;

retrieve a target request arrival time and a target request ratio for the each target service in the one or more service call chains from the API/URL call chain;

predict a request number for the each target service in the one or more service call chains from the API/URL call chain; and store the request number for the each target service.

16. The computer system of claim 13, wherein scaling the target service based on the attribute template and the request metrics comprises:

retrieve a read request arrival time for the target service from the attribute template;

calculate a minimum arrival time for the target service based on the read request arrival time for the target service from the attribute template;

predict a request number for the target service based on the attribute template;

calculate a required container number and a ready time for the target service based on a predicted request number for the target service; and scale the target service to the required container number.

17. The computer system of claim 16, wherein scaling the target service based on the attribute template and the request metrics further comprises automatically scaling the target service before an arrival time, wherein the arrival time is a minimum arrival time between the target service and the start service minus the ready time for the target service.

* * * * *